United States Patent [19]
Vann

[11] Patent Number: 5,823,652
[45] Date of Patent: Oct. 20, 1998

[54] FIBER OPTIC METHODS OF LIGHTING SCULPTURED ACRYLIC

[76] Inventor: James S. Vann, 805 Garden of the Gods Rd., #G, Colorado Springs, Colo. 80907

[21] Appl. No.: 684,974

[22] Filed: Aug. 7, 1996

[51] Int. Cl.$^6$ .................. F21V 8/00; G02B 6/00
[52] U.S. Cl. .................. 362/32; 362/806; 385/115; 385/901; 40/547
[58] Field of Search .................. 362/32, 806, 812, 362/311; 40/547, 541; 385/115, 901, 147

[56] References Cited

U.S. PATENT DOCUMENTS

| | | | |
|---|---|---|---|
| 2,507,909 | 5/1950 | Kaysen | 362/32 |
| 4,113,347 | 9/1978 | Gaertner | 40/547 |
| 4,745,525 | 5/1988 | Sheehy | 362/32 |
| 4,917,448 | 4/1990 | Oppenheimer | 362/32 |
| 5,013,109 | 5/1991 | Zelan et al. | 362/32 |
| 5,066,085 | 11/1991 | Gimbutas | 362/32 |
| 5,375,043 | 12/1994 | Tokunaga | 362/32 |

Primary Examiner—Thomas M. Sember
Attorney, Agent, or Firm—G. F. Gallinger

[57] ABSTRACT

Typically acrylic is lighted by grouping end portions of a multiplicity of light transmitting fiber optic cables together to form a desired shape or pattern. The problem with this approach is that because so many cables are required, it is difficult, time consuming, and relatively expensive. This invention discloses three artistic and novel methods of light sculpturing acrylic with fiber optic cable. In one method an elongate channel is carved on a rear side portion of the acrylic; a front side portion of the channel is colored; and one end portion of a fiber optic cable is laid in and secured along the channel. In a second method a rearwardly extending post is mounted on a rear side portion of the acrylic; and one end portion of the fiber optic cable is secured to the top portion of the post, so that light transmitted through the cable disperses over an area on the acrylic adjacent to the post. In a third method the rear side portion of the acrylic is painted and a shape is carved thereon. The shape is then covered with an end of a clear plastic post. A cable accepting hole is drilled in the other end of the clear post and one end of the fiber optic cable is secured therein. In each method a conventional light source is applied to the other end of the fiber optic cable.

19 Claims, 1 Drawing Sheet

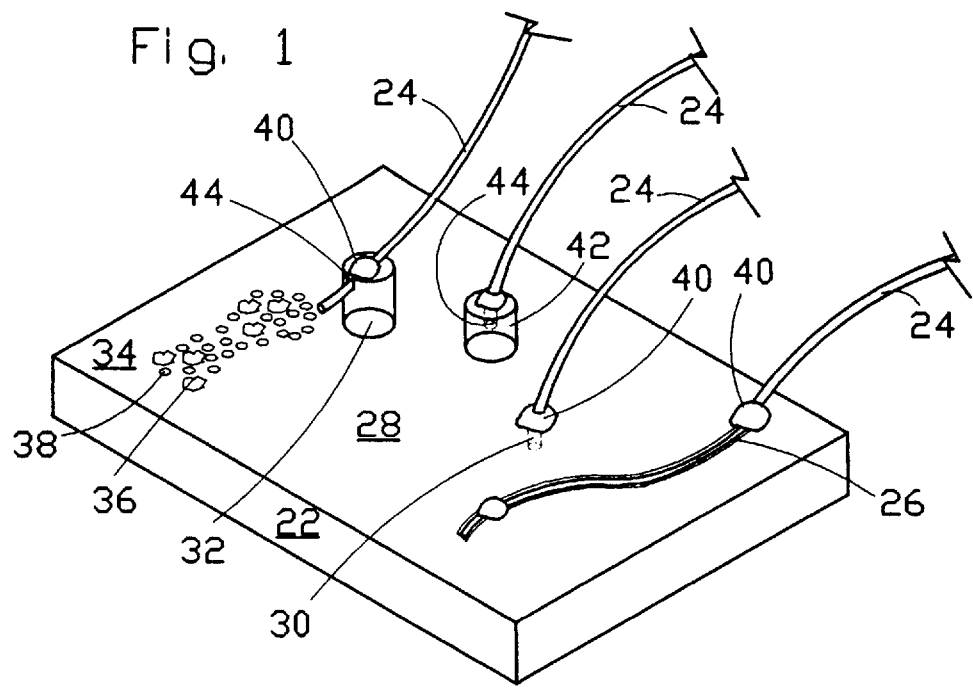
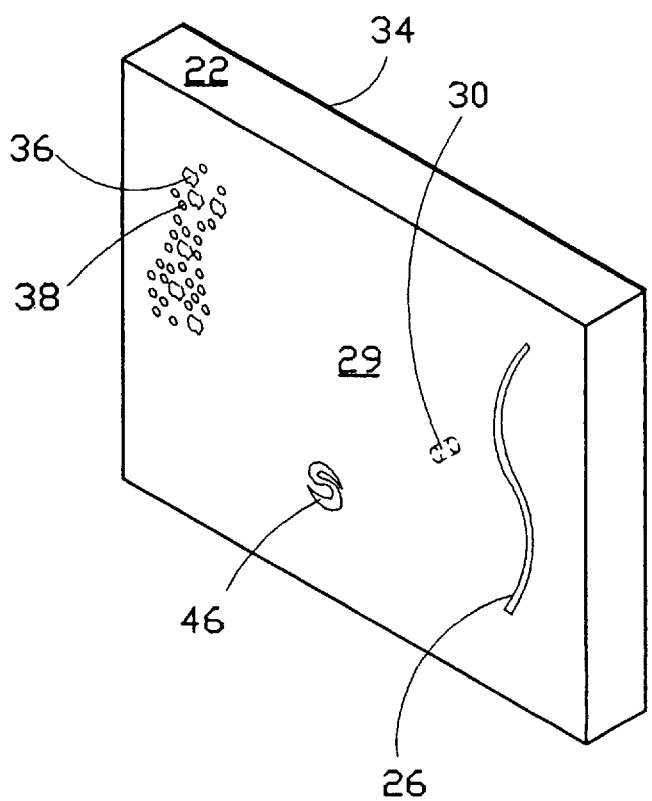

FIBER OPTIC METHODS OF LIGHTING SCULPTURED ACRYLIC

FIELD OF INVENTION

This invention relates to lighting which uses fiber optic cables as a light source. More particularly this invention relates to artistic methods of lighting sculptured and/or painted acrylic.

BACKGROUND OF THE INVENTION

Fiber optic cables are commonly used to transmit light to transparent acrylic plastic sheets. Typically a plurality of cables is required to depict an intricate shape. For example, a lighted letter is produced by filling in an outline of the letter with a multiplicity of cable ends so that light received from an end portion of each cable shines forwardly through an adjacent portion of the outline of the letter.

One problem with this method of lighting is that it is time consuming to illuminate even a moderately sized area; a relatively large number of fiber optic cables are required. Another problem with this technique is that it is difficult to produce a continuous level of illumination across a large area. Yet another limitation of this method is that it is difficult to gradually vary the intensity of illumination between adjacent illuminated areas.

OBJECTS AND STATEMENT OF INVENTION

It is an object of this invention to disclose a method of lighting acrylic with fiber optic cable which lends itself to artistic display. It is an object of this invention to disclose a method of illumination which produces a continuous intensity of illumination over a large area. It is yet a further object of this invention to disclose a fiber optic illumination method which facilitates gradually varying the intensity of illumination between adjacent illuminated areas. It is a final object of this invention to disclose a method of illumination with fiber optic cable which is substantially easier and faster to use than methods here before known.

One aspect of this invention provides for a method of lighting clear acrylic with a fiber optic cable comprising the following steps: carving an elongate channel on a rear side portion of the acrylic having a width marginally greater than a diameter of the fiber optic cable; coloring a front side portion of the channel; laying one end portion of the fiber optic cable in and along the channel; securing the end portion of the fiber optic cable within the channel; and, applying a light source to an other end of the fiber optic cable thereby illuminating the elongate channel.

Another aspect of this invention provides for a method of lighting clear acrylic with a fiber optic cable comprising the following steps: mounting a rearwardly extending post on a rear side portion of the acrylic; fastening one end portion of the fiber optic cable to a top portion of the post, said cable end terminating substantially above the rear side portion of the acrylic and to a side of the post; applying a light source to an other end of the fiber optic cable so that light transmitted through the cable disperses over an area on the acrylic adjacent to the post.

Yet another aspect of this invention provides for a method of lighting clear acrylic with a fiber optic cable wherein said lighted area is substantially larger than the diameter of the cable, comprising the following steps: painting a rear side portion of the acrylic; carving out a shape on the rear side portion of the painted rear side of the acrylic; covering the shape with an end of a clear plastic post and securing said post thereon; drilling a cable accepting hole in an end of the post opposite the end thereon covering the shape; securing one end of the fiber optic cable in the hole; and, applying a light source to the other end of the cable thereby illuminating the entire shape covered by the post.

In this application, including the claims herein, acrylic is defined to include any clear plastic including but not limited to acrylic plastic.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawings wherein:

FIG. 1 is a perspective view of a sheet of acrylic having light transmitting fiber optic cables mounted on its rear side portion.

FIG. 2 is the sheet of acrylic shown in FIG. 1 as viewed from its front side portion.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a sheet of acrylic 22 having light transmitting fiber optic cables 24 mounted on its rear side portion 28. FIG. 1 shows three different methods of light sculpturing clear acrylic 22 with fiber optic cables 24.

In a first method an elongate channel 26 is carved with a router on a rear side portion 28 of the acrylic 22. In most applications the rear side portion 28 of the acrylic 22 is painted 34 prior to carving the elongate channel 26. The channel 26 has a width marginally greater than a diameter of the fiber optic cable 24. The front side portion of the channel 26 is then colored with different colors, most preferably this is done with a fiber tipped ink marking pen 52. One end portion of the fiber optic cable 24 is then laid and secured in and along the channel 26; most preferably it is secured therein with hot plastic glue. Finally a light source is applied to the other end of the fiber optic cable 24 thereby illuminating the elongate channel 26.

In a second method a rearwardly extending post 32 is mounted on a rear side portion of the acrylic 22. Most preferably the rear side portion 28 of the acrylic 22 has been painted 34 before mounting the post 32 thereon. One end portion of the fiber optic cable 24 is then fastened to the top portion of the post 24. Most preferably, the post 32 is fastened to the acrylic 22, and the cable 24 to the post 32 with hot plastic glue 40 dispensed from a hot plastic glue gun 50. A radial cut 44 may be placed in the post 32 to facilitate alignment of the fiber optic cable 24 therein. The one end portion of the fiber optic cable 24 is positioned to terminate substantially above the rear side portion 28 of the acrylic 22 and to a side of the post 32 so that when a light source (not shown) is applied to the other end of the fiber optic cable 24 light transmitted through the cable 24 disperses over an area to a side of the post 32.

In a preferred embodiment of the second method the step of blistering 36 the paint 34 with a hot air gun 48, and thereafter removing the paint 34 where it is blistered 36 is undertaken. Most preferably an additional coat of differently colored paint 34 is then applied over the blistered 36 portion. Next the multi-colored painted 34 surface may be randomly tapped with a hard object 54 to remove all paint where tapped so that light may brightly shine through the unpainted area 38. For many applications where a celestial galaxy having stars is depicted, the first coat of paint 34 is an opaque black and the second coat of paint 34 is a translucent blue.

In a third method of lighting clear acrylic 22 with a fiber optic cable 24, wherein said lighted area is substantially larger than the diameter of the cable 24, the rear side portion 28 of the acrylic 22 is first painted 34. A shape 46 is then carved on the painted 34 rear side portion 28 of the acrylic. The carved shape 46 is then covered with an end of a clear plastic post 42. The clear plastic post 42 is then secured on the rear side portion 28 of the acrylic 22. A cable accepting hole 44 is drilled in the end of the clear post 42 opposite the end thereon covering the shape 46; and one end of the fiber optic cable is secured in the hole 44. Most preferably, the clear post 42 is secured to the acrylic 22, and the cable 24 is secured in the hole 44 with hot plastic glue 40. As before a light source (not shown) is applied to the other end of the cable 24 thereby illuminating the entire shape 46 covered by the clear post 42. The carved shape 46, on the rear side portion 28 of the acrylic 22, may comprise intricate line work. In a preferred embodiment the carved shape 46 is colored with a fiber tipped ink pen 52 before the clear post 42 is secured thereon.

In a fourth method of lighting clear acrylic 22 with a fiber optic cable 24 a hole 30 having a diameter marginally larger than the fiber optic cable 24 is drilled on a rear side portion 28 of the acrylic 22 having a depth substantially less than a thickness of the acrylic 22. One end portion of the fiber optic cable 24 is then inserted and glued in the hole 30 with hot plastic glue 40. Finally a light source (not shown) is applied to the other end of the cable 24 thereby illuminating the one end portion of the cable in the hole 30.

FIG. 2 is the sheet of acrylic 22 shown in FIG. 1 as viewed from its front side portion 29. On its right side portion we see a multi-colored illuminated channel 26. In a central portion we see an illuminated intricate shape 46. On a left side portion thereof we see blue colored blisters 36, having clear unpainted areas 38 where light brightly shines therethrough.

Sheets of illuminated and sculptured acrylic 22 may be hung to form suspended ceilings (not shown). Typically the suspended ceiling is made from 4'×8' sheets of acrylic 22 which are ¾" thick to ensure adequate sag resistance. The sheets of acrylic 22 are hung from ½" acrylic rods (not shown) which are bonded in ½" holes drilled therein. Conventional methods of hanging the sheets of acrylic 22 are used which include spring and rubber mounts (neither shown).

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. A method of lighting clear acrylic with a fiber optic cable comprising the following steps:

carving an elongate channel on a rear side portion of the acrylic having a width marginally greater than a diameter of the fiber optic cable;

coloring a front side portion of the channel;

laying one end portion of the fiber optic cable in and along the channel;

securing the end portion of the fiber optic cable within the channel; and, applying a light source to an other end of the fiber optic cable thereby illuminating the elongate channel.

2. A method as in claim 1 wherein the rear side portion of the acrylic is painted prior to carving the elongate channel.

3. A method as in claim 2 wherein a router is used to carve the painted acrylic.

4. A method as in claim 3 wherein different colors are used to color the front side portion of the carved channel.

5. A method as in claim 1 wherein a fiber tipped ink marking pen is used to color the front side portion of the carved channel.

6. A method as in claim 1 wherein hot plastic glue is used to secure the end portion of the cable in and along the channel.

7. A method of lighting clear acrylic with a fiber optic cable comprising the following steps:

mounting a rearwardly extending post on a rear side portion of the acrylic;

fastening one end portion of the fiber optic cable to a top portion of the post, said end terminating substantially above the rear side portion of the acrylic and to a side of the post;

applying a light source to an other end of the fiber optic cable so that light transmitted through the cable disperses over an area on the acrylic adjacent to the post.

8. A method as in claim 7 further comprising the step of painting a rear side portion of the acrylic before mounting the post thereon.

9. A method as in claim 8 wherein hot plastic glue is used to fasten the post to the acrylic, and the cable to the post.

10. A method as in claim 9 further comprising the step of placing a radial cut in the post to facilitate alignment of the fiber optic cable therein.

11. A method as in claim 8 further comprising the step of blistering the paint and thereafter removing the paint where blistered.

12. A method as in claim 11 wherein a hot air gun is used to blister the paint.

13. A method as in claim 11 wherein an additional coat of differently colored paint is applied over the blistered portion.

14. A method as in claim 13 wherein the multi-colored surface is randomly tapped with a hard object to remove all paint where tapped so that light may brightly shine through the unpainted area.

15. A method as in claim 14 wherein the first coat of paint is an opaque black and the second coat is a translucent blue.

16. A method of lighting clear acrylic with a fiber optic cable wherein said lighted area is substantially larger than the diameter of the cable, comprising the following steps:

painting a rear side portion of the acrylic;

carving out a shape on the rear side portion of the painted rear side of the acrylic;

covering the shape with an end of a clear plastic post and securing said post thereon;

drilling a cable accepting hole in the end of the post opposite the end thereon covering the shape;

securing one end of an fiber optic cable in the hole;

applying a light source to the other end of the cable thereby illuminating the entire shape covered by the post.

17. A method as in claim 16 wherein the post is secured to the acrylic, and the cable is secured in the hole with hot plastic glue.

18. A method as in claim 17 wherein the shape carved on the rear side of the acrylic comprises intricate line work.

19. A method as in claim 18 wherein the shape is colored with a fiber tipped ink pen before the post is secured thereon.

\* \* \* \* \*